H. TOLLE.
ELECTRICAL METER.
APPLICATION FILED MAR. 5, 1915.
1,155,384.
Patented Oct. 5, 1915.
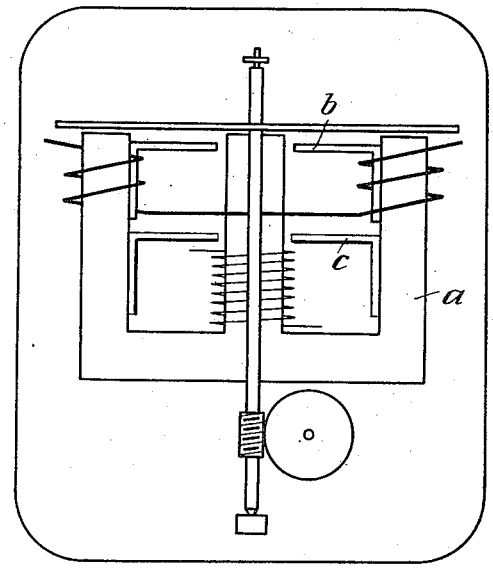

UNITED STATES PATENT OFFICE.

HEINRICH TOLLE, OF BERLIN, GERMANY, ASSIGNOR TO SIEMENS-SCHUCKERTWERKE G. M. B. H., OF BERLIN, GERMANY, A CORPORATION OF GERMANY.

ELECTRICAL METER.

1,155,384.  Specification of Letters Patent.  Patented Oct. 5, 1915.

Application filed March 5, 1915. Serial No. 12,405.

*To all whom it may concern:*

Be it known that I, HEINRICH TOLLE, a German citizen, and resident of Berlin, Germany, have invented certain new and useful Improvements in Electrical Meters, of which the following is a specification.

In electricity meters according to the Ferraris type the speed curve as function of the load shows a drop at higher loads and it is the object of my present invention to compensate this drop in the speed curve of a meter. For this purpose a magnetic shunt is provided in parallel to the series field and this shunt is of such dimensions and of such an arrangement that the magnetic flux carried thereby does no more follow the initial approximately linear part of the magnetizing curve in case of a load at which approximately the drop in the original curve would start. In this manner the meter will work upon the part on and above the knee of the magnetizing curve, where the iron approaches the point of magnetic saturation. Thus the flux passing through the shunt will no more be proportionate to the current strength but will increase with the load in a smaller proportion. In consequence of this for a higher load an increase of the originally present speed will take place. This increase in speed will be so controlled by properly arranging and dimensioning the shunt, so that it will effect an increase of the actual speed of the meter armature and bring the same up to the desired value.

I regard my invention especially advantageous for alternating current induction meters of the Ferraris type although it may also be used with a more or less advantageous effect in continuous current watt hour meters which contain iron.

The accompanying drawing shows an alternating current meter of the Ferraris type having my present improvement incorporated.

Referring now more particularly to the drawing I have shown the iron *a* of a Ferraris meter as having the novel magnetic shunt *b* for the series field according to my present invention. As far as the present invention is concerned it is not essential whether besides this a similar shunt *c* for the voltage field is employed, although this shunt is indicated in the drawing.

It is unessential whether the original magnetically effective iron of the meter is arranged in the armature, in the field, in the auxiliary coils or at any other place.

Having thus described my invention I do not wish to be understood as confining myself to the precise constructions shown and described herein but

I claim as new and desire to secure by Letters Patent of the United States:—

1. An alternating current meter of the Ferraris type comprising a series field and a voltage field, and a magnetic shunt for said series field, said shunt being designed to compensate the drop of speed at higher loads.

2. An alternating current meter of the Ferraris type comprising a series field, a voltage field, and a magnetizable member for said series field, said member being arranged to form a shunt essentially for said series field and designed to become magnetically saturated at higher current loads for compensating the drop of speed occurring thereby.

3. An alternating current meter of the Ferraris type comprising a triple-shanked iron, series windings mounted on the two outer shanks of said iron, a voltage coil mounted on the middle shank and a magnetizable member interposed between said outer shanks, said magnetizable member being arranged to form a shunt essentially for said series field and designed to become magnetically saturated at higher current loads for compensating the drop of speed occurring thereby.

4. An alternating current meter of the Ferraris type comprising a triple-shanked iron core, series coils mounted upon the outer shanks of said core, a voltage coil mounted upon the middle shank, magnetizable members provided at the ends of said outer shanks and mounted to be under the influence of said series coils, said members being designed to form a saturated magnetic shunt for the series field at a higher current load, and further magnetizable members mounted to form a shunt only for said voltage coil.

In testimony whereof I have hereunto set my signature in the presence of two subscribing witnesses.

HEINRICH TOLLE.

Witnesses:
HENRY HASPER,
WOLDEMAR HAUPT.